(12) United States Patent
Gregoratti et al.

(10) Patent No.: US 8,535,434 B2
(45) Date of Patent: Sep. 17, 2013

(54) MATERIAL IN THE FORM OF LITHIUM FLUORIDE POWDER CONTAINING COLOUR CENTRES, METHOD FOR PREPARATION AND USE THEREOF

(75) Inventors: Luca Gregoratti, Bagnaria Arsa (IT); Marco Peloi, Udine (IT); Marija Kosec, Smlednik (SI); Danjela Kuscer Hrovatin, Ijubljana (SI); Giuseppina Palma, Giugliana in Campania (IT)

(73) Assignees: Ellettra-Sincrotrone Trieste Societa' Consortile per Azioni (IT); Jozef Stefan Institute (IT)

( * ) Notice: Subject to any disclaimer, the term of this patent is extended or adjusted under 35 U.S.C. 154(b) by 0 days.

(21) Appl. No.: 13/261,322

(22) PCT Filed: Dec. 17, 2010

(86) PCT No.: PCT/EP2010/070096
§ 371 (c)(1),
(2), (4) Date: Jun. 12, 2012

(87) PCT Pub. No.: WO2011/073399
PCT Pub. Date: Jun. 23, 2011

(65) Prior Publication Data
US 2012/0325112 A1 Dec. 27, 2012

(30) Foreign Application Priority Data
Dec. 18, 2009 (IT) .............................. PD2009A0376

(51) Int. Cl.
*C01D 3/02* (2006.01)
(52) U.S. Cl.
USPC .... 106/401; 106/31.6; 106/31.65; 106/286.7; 106/266.8; 204/157.44
(58) Field of Classification Search
USPC ................. 106/401, 461, 499.1, 31.6, 31.65, 106/286.7, 286.8; 423/499.1, 490; 204/157.44; 428/402
See application file for complete search history.

(56) References Cited

U.S. PATENT DOCUMENTS

| 4,013,796 A * | 3/1977 | Swinehart et al. ............ 423/490 |
| 7,371,338 B2 * | 5/2008 | Amatucci ................... 252/518.1 |
| 2011/0024683 A1 * | 2/2011 | Bekiarian ............... 252/301.4 H |

FOREIGN PATENT DOCUMENTS

| SU | 1028100 A1 * | 8/1995 |
| WO | WO2008095884 | 8/2008 |

OTHER PUBLICATIONS

Noginov et al, "Color-center powder laser: the effect of pulverization on color-center characteristics", Journal Optical Society of America B, vol. 14, (1997) pp. 2153-2160.*
M.Kumar et al; "Studies of Swift Heavy Ion Induced Colour Centres in LIF Thin Films Deposited on Silica Substrates"; Institute of Physics Publishing; 2006; 2935-2940.
R.M. Montereali et al; "Optical Gain of F2 Colour Centres in LIF Confining Structures Realised by Electron-Beam Lithography"; Optics Communications; 2009; 201-208.
M.Cremona, et al.; "Optical Waveguides Produced in LiF by MeV Ion Bean Bombardment"; Applied Physics Letters; Nov. 25, 2002; vol. 18, No. 22; p. 4103-4105.

* cited by examiner

*Primary Examiner* — Anthony J Green
(74) *Attorney, Agent, or Firm* — Stetina Brunda Garred & brucker (57) ABSTRACT

It is describes a material in the form of lithium fluoride powder containing color centers and the method for its preparation, by the formation of color centers based on irradiating the powder with synchrotron radiation (light). The method involves mechanically reducing the size of the particles that form the LiF powder and the formation of color centers therein by its exposure to synchrotron radiation. The so activated powder, which maintains the transparency characteristics of the original material if exposed to sunlight, can find wide use as an additive both in common printing inks and in pigments used in the artistic field to be used for the formation of marks on artifacts for anti-counterfeiting/identification purposes.

13 Claims, 5 Drawing Sheets

MATERIAL IN THE FORM OF LITHIUM FLUORIDE POWDER CONTAINING COLOUR CENTRES, METHOD FOR PREPARATION AND USE THEREOF

FIELD OF THE INVENTION

The present invention relates to a material in the form of lithium fluoride powder consisting of activated submicrometer particles, i.e. which present a high number of colour centres obtained by exposing the powder to synchrotron radiation, and to a method for preparation thereof.

The invention also relates to the use of said material as an additive for inks or paints usable for marking articles of which the authenticity is to be guaranteed or which are to be catalogued, by forming identification marks directly on them or on supports (tags) to be applied to said articles.

STATE OF THE ART

A colour centre (or CC) is a defect in a crystalline solid consisting of the vacancy is of a negative ion in a site of the solid and the presence of an electron in the same site. These defects have the ability to absorb light and lead the crystals, which are normally transparent crystals, to be coloured. These defects can be obtained by irradiating a sample of the crystalline solid with electromagnetic radiation or with an ionizing beam of suitable characteristics.

There are many materials on which a CC can be created, but the most studied in the scientific field is undoubtedly LiF. In this respect, the formation of CCs in crystals and amorphous LiF films has been studied with several types of irradiation: photons, electrons, neutrons and different kinds of ions. The reason for LiF being the most studied material is that the main types of CCs able to be created (technically referred to as $F_2$ and $F_3^+$) can be produced in a fairly simple manner, and in very high numbers and that they absorb and emit radiation in particularly favourable visible bands. Not least, LiF is a transparent material with particular optical properties and, in theory, it could have different applications even though, in practice, some of its characteristics (such as its high hygroscopicity) render it undesirable for actual applications in that they make it difficult to manipulate.

The current state of CC research is focussed, as can be inferred from the most recent publications in scientific journals, on studying the characteristics of CCs created with the various available ionizing sources; indeed, the different parameters characterizing their formation (e.g. density, details of absorption and emission spectra) vary according to the characteristics of the source used for CC formation (M. Kumar, F. Singh, S. A. Khan, A. Tripathi, D. K. Avasthi and A. C. Pandey, "Studies of swift heavy ion induced colour centres in LiF thin films deposited in silica substrates", *J. Phys. D: Appl. Phys.* 39 (2006) 2935-2940). There are also studies aimed at other possible applications of CCs, for instance the possibility of generating waveguides by forming "tracks" of CCs (R. M. Montereali and M. Piccinini, "Optical gain of $F_2$ colour centres in LiF confining structures realised by electron-beam lithography", *Optics Communications* 209 (2002) 201-208; M. Cremona, J. A. M. Pereira, S. Pelli and G. C. Righini, "Optical waveguides produced in LiF by MeV ion beam bombardment", *Appl. Phys. Lett.* 81 (2002) 4103-4105).

Research in these fields, however, is undertaken with often very expensive instruments while attempting to isolate the measurement as much as possible from possible interference due to the external environment. For instance, in many cases LiF crystals are used rather than amorphous films or microparticles, because crystals are ordered assemblies of atoms with very few impurities and with well-defined inherent properties which are in many cases predictable in theory, whereas in amorphous films or powders these properties can depend on the degree of disorder of the atoms. Furthermore, the evaporations are carried out in vacuum chambers (very often in an ultra-high-vacuum environment (UHV)), because this ensures that any gaseous elements present in the atmosphere are not deposited on the surface or even penetrate the crystals thus altering the measurements, whereas irradiation of the sample takes place in the substantially optimal conditions of pressure, temperature and distance. All these conditions make it very difficult to apply this technology on a large scale, because they impose very high costs on the required technical equipment, as well as demanding adequate training and operative manual skills of the technicians in charge. Another possible limitation to its large scale use derives from the fact that LiF is known to be a dangerous substance if swallowed in large amounts or if in contact for a long period with delicate parts of the body, such as the eyes. Its use on a large scale or on goods that are used daily involves proceeding in a protected manner. Therefore, products based on LiF have to be protected in order to avoid contact therewith and/or its alteration and/or its removal due to accidental contacts.

Despite these drawbacks, the use of lithium fluoride to mark articles for anti-counterfeiting/identification purposes in order to guarantee their authenticity or identity, is potentially of great applicative interest.

For example, WO 2008/095884 describes a method for marking articles consisting of forming a mark on articles or supports to be applied thereon, the authenticity of which is to be guaranteed, or which are to be catalogued, the mark being obtained by depositing lithium fluoride films at room pressure in an atmosphere consisting of air or nitrogen, and the subsequent formation of colour centres thereon by ionizing radiation. This method, though very effective for marking any kind of item is as well as considerably simplifying the technique of CC formation on LiF films, is limited by the need to directly expose the articles to be marked to ionizing radiation produced by complex devices, which are difficult to transport and generally only compatible with small sized articles and whose operation requires specialized personnel.

Furthermore, in view of the previously mentioned difficulties with using lithium fluoride, this latter has never been considered for use as a marker in the form of an activated powder in combination with other materials, for instance as a marker ingredient in inks, paints, glues and similar products.

Therefore, a purpose of the present invention is to provide a material in the form of an activated powder, i.e. containing a sufficient number of colour centres, to be used as a marker, even when combined with other materials, for forming marks on several kinds of articles either by using tags or directly onto the article.

A further purpose of the present invention is to provide a method for preparing the LiF powder activated by ionizing radiation, such as synchrotron light.

SUMMARY

The material in the form of activated LiF powder and the method found by the Inventors fulfil the aforesaid objects, since they allow certain drawbacks deriving from the use of CCs to be overcome under the conditions in which it is used in research laboratories where the purpose is mainly scientific.

In a first aspect the present invention, therefore, provides a material in the form of a lithium fluoride powder characterized by:
comprising particles having an average size of 160 nm and a size distribution that can be approximated by a Gaussian curve centred at said size value and having a width at half height of 195 nm; and
having a colour centre content comprised from $1\times10^{16}$ CC/cm$^3$ to $1\times10^{19}$ CC/cm$^3$.

Particles of smaller size than the aforesaid values can be present, but their quantification proves difficult and in any case they do not modify the general behaviour of the powders as herein disclosed.

As LiF is known to be a polar compound, and hence tending to coalesce, the LiF particles can be in the form of single microparticles or in the form of is microaggregates. The LiF powder of the invention, therefore, may also comprise LiF agglomerates greater than 5 μm in size, but in a quantity less than 1% of the total particles. Such aggregates can be a residue deriving from the grinding processes and/or from coalescence processes.

In a second aspect, the present invention also provides a method for preparing material in the form of LiF powder as aforedefined, comprising at least the steps of:
a) mechanically degrading a commercial LiF powder by grinding or milling processes until obtaining a submicrometer-size distribution thereof i.e. a powder comprising particles having an average size of 160 nm and a size distribution that can be approximated by a Gaussian curve centred at this size value and having a width at half height of 195 nm;
b) irradiating homogeneous layers of the powder previously having a total area ranging from a minimum of 10 mm$^2$ to a maximum of 3000 mm$^2$ and a thickness not greater than 1 mm, by exposure thereof to a beam of non-monochromatized radiation (i.e. white synchrotron light) of an energy comprised from 3 to 15 keV and characterized by an intensity not less than $1\times10^{11}$ photons/s/mm$^2$, with a total dose comprised from $10^{14}$ to $10^{17}$ photons.

Any aggregates greater than 5 μm in size remaining after the grinding process or deriving from coalescence processes can be removed, for the most part, by known technical means such as sieving or filtration. For the purposes of the invention the material in the form of the LiF powder comprises agglomerates greater than 5 μm in size in a quantity up to 1% of the total number of particles.

The parameter used for describing particle size is that commonly used in the scientific field of dimensions, i.e. their diameter, assuming their shape to be averagely spherical. As it is possible to find documents in which the parameter used to describe particle size is their area, it can be said that, as an example of conversion, a size of 160 nm corresponds to an area of 0.02 μm$^2$.

A further aspect of the present invention is the use of the material in the form of the activated LiF powder of the invention as a marker additive for the preparation of inks, paints, glues, by combining the same with bases and diluents appropriate for inks and paints for the various printing techniques (such as for example ink-jet, is silk-screen printing, flexography etc.) or glues, to be used for anti-counterfeiting and/or identification purposes.

In another aspect, the present invention provides an apparatus for the method for preparing activated powder comprising:
a mill for grinding commercial lithium fluoride powder;
a sample holder in which to place the ground powder to be exposed to synchrotron light consisting of at least one, but preferably several cells, having a total area ranging from a minimum of 10 mm$^2$ to a maximum of 3000 mm$^2$ and a depth no greater than 1 mm;
if several cells are used, an automated control system for multiple exposures;
a source of synchrotron radiation, controlled by computerized means, which produces non-monochromatized radiation having an intensity not less than $1\times10^{11}$ photons/s/mm$^2$, and an energy range from 3 to 15 keV, having preferably a bell-shaped distribution centred at 8 keV.

The advantages gained with the present invention will become clear to an expert in the art from the following detailed description, with reference to the following figures, of specific embodiments provided for illustrative and non limiting purposes.

BRIEF DESCRIPTION OF THE FIGURES

FIG. 1: the figure shows, by way of example, a schematic view of the apparatus for activating the LiF powder. The powder is inserted into the housings formed from a sample holder (1); if required, several housings can be created on the same sample holder such as to maximize powder production. The sample holder is placed in front of the radiation beam (3) produced from the source (4) possibly on a system for scanning the sample holder (2) operated by automated means (5) also controlled by computer (6).

FIG. 3: FIG. A shows the size distribution of filtered commercial particles (dotted curve) and those obtained by the grinding and filtering process (solid curve). Both curves can be represented by two Gaussian functions centred respectively at 658 nm and 160 nm and having a width at half height of respectively 618 nm and 195 nm. The residual number of agglomerates which are greater than 5 μm in area amount to less than 1% of the total number of particles. In order to avoid as far as possible any adulterations due to the tendency of LiF particles to auto-coalesce and interactions with the instruments normally used for determining size distribution, the particle distributions were calculated from the SEM images obtained from filtered powders dispersed onto smooth substrates such as silica crystals. For the size measurements, particles were selected from the images in sufficient numbers to obtain adequate statistics. FIG. B is a typical SEM image of the ground and filtered powder used for the size calculations.

DETAILED DESCRIPTION OF THE INVENTION

The possibility of using lithium fluoride in the form of activated powder as a marker, by forming marks for anti-counterfeiting/identification purposes directly on items and/or on tags to be applied thereto, is of great interest in several fields. In order to be effectively used as a marker additive in products such as inks, paints or glues and similar products, this activated powder must consist of microparticles and/or agglomerates thereof having a sufficient size and a sufficient CC content.

In this respect, the size of the particles, whether microparticles and/or aggregates thereof, must be such as to obtain homogeneously dispersed and stable suspensions, while the CC content is such as to enable the activated LiF particles to be effectively determined. Such technical characteristics are essential to enable the activated LiF powder to be effectively used as a marker additive for the products in which it is incorporated.

For this purpose the Inventors have found that a material can be obtained in the form of a lithium fluoride powder characterized by comprising particles having a mean size of 160 nm and a size distribution that can be approximated by a Gaussian curve centred on said size value and having a width at half height of 195 nm and comprising a residual number of agglomerates 5 μm in size in a quantity up to or less than 1% of the total number of particles and having a number of colour centres comprised between $1\times10^{16}$ CC/cm$^3$ and $1\times10^{19}$ CC/cm$^3$, preferably $2\times10^{18}$ CC/cm$^3$, and is sufficiently stable and detectable, even when combined with other substantially diluent materials, to be usable in the preparation of products suitable for forming marks on items or tags to be applied thereon. Said LiF material can be obtained by a preparation method based on mechanical grinding processes starting from a commercial powder, which has a greater particle size distribution, followed by irradiation of the submicrometer-sized powder achieved using a suitable ionizing radiation beam. In this manner a material is obtained having LiF microparticles of an adequate size for use in the form of homogeneously dispersed and stable suspensions and with a sufficient number of CCs for detection by illuminating it with a light source emitting blue-ultraviolet light, and, optionally, an orange filter, and measuring the emission spectrum by suitable instrumentation (e.g. spectrofluorometry), as described in WO 2008/095884, even when combined with other materials.

Figure 2:
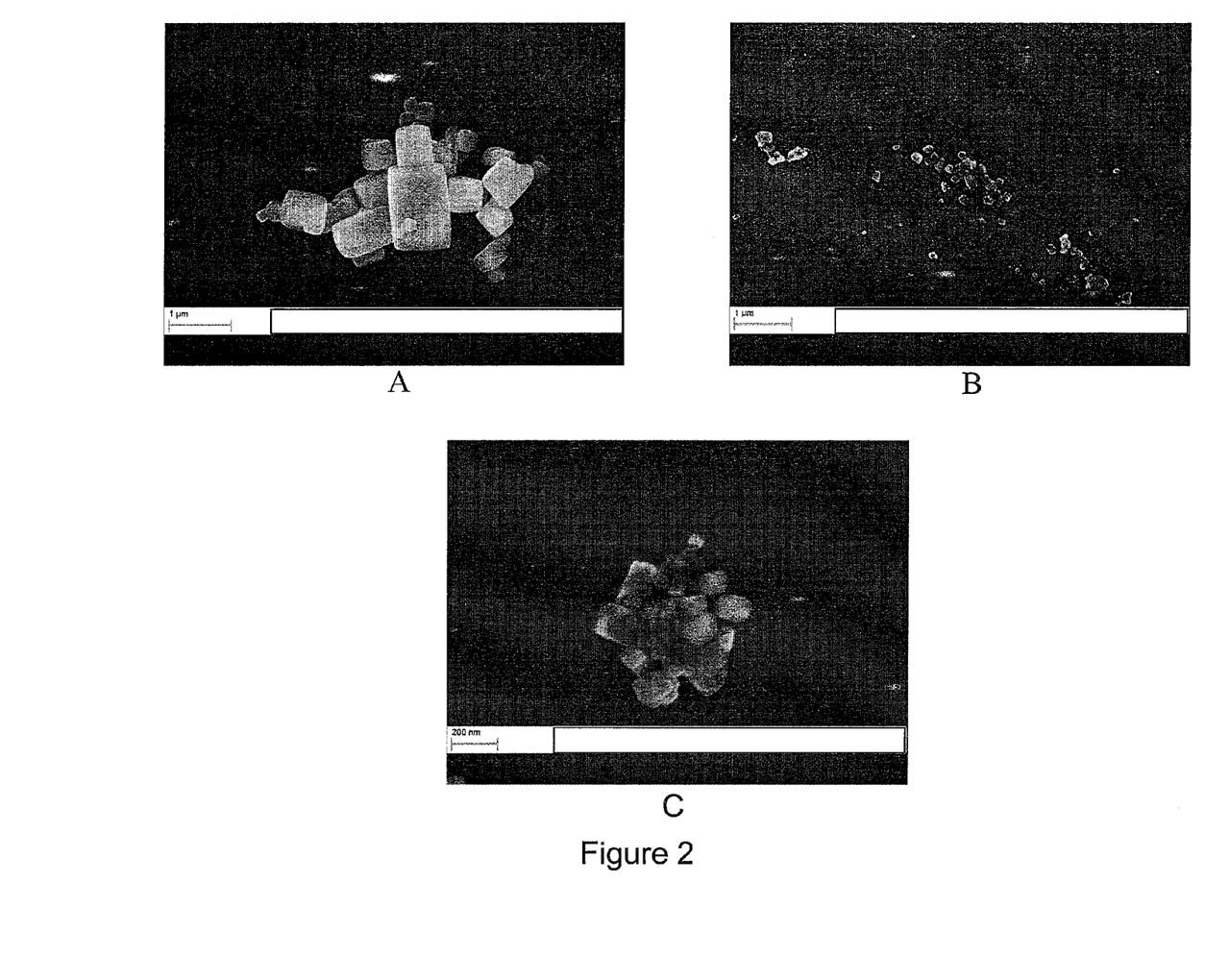
FIG. 2: the figure shows a comparison between scanning electron microscope (SEM) images of commercial LiF powder (A) and LiF powder obtained by the milling process (B). The powder obtained after the mechanical degradation treatment consists of much smaller particles that than those constituting the commercial powder agglomerates. The tendency of lithium fluoride to form is agglomerates is clearly shown in image (C) which shows an agglomerate of about 300×300 nm$^2$ in size but formed of particles which are actually much smaller.

LiF is a white crystalline solid which is also commercially available as a powder, characterized by comprising agglomerates or particles greater than 5 μm in size in a quantity of more than 1% of the total number of particles. Most of the particles of the commercial LiF powder are actually aggregates of smaller particles generated by the strongly polar nature of LiF (FIG. 2 C). It is, however, extremely difficult to produce the very small LiF particles needed to form stable suspensions for producing industrial inks/paints.

Nevertheless, by using milling machines a finer powder can be obtained which still has a large amount of agglomerates, but of smaller size i.e. particles having a mean size of 160 nm and a size distribution that can be approximated by a Gaussian curve having a width at half height of 195 nm and comprising a residual number of agglomerates greater than 5 μm in size in a quantity up to or less than 1% of the total number of particles. The purpose of obtaining a powder with particles of such small size is to attain the best formulation should it be required, for instance, to incorporate the LiF powder in inks/paints/glues, even pre-existing ones, or in particular pigments at the industrial level.

The subsequent exposure to synchrotron light activates the microparticles obtained by grinding, to create a large number of colour centres. Usable radiation for activating the LiF powder is a beam of white light (i.e. non-monochromatized) having an energy comprised between 3 and 15 keV and a density of photons/s/mm$^2$ not less than $1\times10^{11}$, preferably $3.5\times10^{13}$ photons/s/mm$^2$. The density of CCs created under these conditions with a total dose of between $10^{14}$ and $10^{17}$ photons is comprised between $1\times10^{16}$ CC/cm$^3$ and $1\times10^{19}$ CC/cm$^3$, preferably of $2\times10^{18}$ CC/cm$^3$.

Given the submicrometer size of the particles from which it is composed, the activated powder thus obtained can be used in the following modes: a) used as an additive for formulating inks/paints/glues which are either invisible, i.e. where both the ink base and the LiF powder, once the mark or inscription is fixed, are invisible if illuminated with sunlight, or are coloured, i.e. where the ink/paint/glue are already themselves coloured; b) used as a colourless additive to be utilized, for instance, for marking paintings by mixing them with the colour of the painting itself. The inks/paints/glues can be used to mark the articles directly or to produce labels that can be subsequently affixed onto the articles to be marked.

The method for preparing the material in the form of the LiF powder of the present invention comprises the steps of:
  mechanically degrading a commercial LiF powder by grinding or milling until obtaining a submicrometric size distribution thereof i.e. particles having a size distribution that can be approximated by a Gaussian curve centred at 160 nm and having a width at half height of 195 nm and preferably comprising a residual number of agglomerates greater than 5 μm in size in a quantity up to or less than 1% of the total number of particles;
  irradiating the previously obtained lithium fluoride powder by exposing it to a beam of white light (i.e. non monochromatized radiation) of energy comprised between 3 and 15 keV, preferably having a bell-shaped distribution centred at 8 keV, with the creation of a number of colour centres comprised between $1\times10^{16}$ CC/cm$^3$ and $1\times10^{19}$ CC/cm$^3$ and preferably $2\times10^{18}$ CC/cm$^3$, with a total dose comprised between $10^{14}$ and $10^{17}$ photons.

The method for preparing the material in the form of activated LiF powder in some of its forms is implemented under the conditions described in detail below, also with reference to the figures.

Amorphous powder or commercial LiF crystals are loaded into a grinding machine, also called a milling machine or a mill of known type. For the purposes of the invention, jar mills of zirconium oxide (ZrO$_2$) with balls of the same material and jars of tungsten carbide (WC) with balls of the same material are preferred. The grinding treatments are carried out at medium and high energy (up to a jar rotation speed of 300 rpm) under dry conditions (no solvent) and wet conditions (using solvents such as isopropanol and acetone). Dry grinding is preferred, since under wet conditions, hence in the presence of solvents, better results were not obtained. Treatment duration is within a time period of 4 hours to a maximum of 48 hours. The parameters which enable the best results to be achieved in terms of particle size are: 300 rpm for rotation speed and 12 hours for duration. These parameters enabled particles to be obtained having a size distribution that can be approximated by a Gaussian curve centred at 160 nm and having a width at half height of 195 nm and comprising a residual number of agglomerates greater than 5 µm in size in a quantity up to or less than 1% of the total number of particles; most of the particles are actually aggregates of smaller particles due to the strongly polar nature of LiF. The conditions of powder insertion (quantity, shape and size of the crucible etc.) depend on the selected grinding machine model which varies according to the manufacturer and do not affect final powder size. The powder irradiation process and hence activation of the CCs is shown schematically in FIG. 1. The device (4) is a very schematic representation of a synchrotron radiation production machine. These machines, also called synchrotrons, are only available in very few laboratories worldwide, generally centres of multidisciplinary research. Synchrotrons can produce electromagnetic radiation (3) over a very broad spectrum (ranging from infra-red to hard X-rays) with absolutely unique characteristics of intensity and spatial and temporal coherence. Of all these characteristics, the one used for the present invention is undoubtedly the high intensity (defined by a photon density of at least $1 \times 10^{11}$ photons/s/mm$^2$ and preferably $3.5 \times 10^{13}$ photons/s/mm$^3$) which enables a sufficient number of CCs to be produced with relatively brief exposures of the LiF powder i.e. of the order of tens of seconds (such as to obtain total exposure doses of between $10^{14}$ and $10^{17}$ photons). This characteristic is very important from the industrial viewpoint where in order to produce a large amount of inks/paints, a large amount of activated LiF powder is also required.

Figure 1:
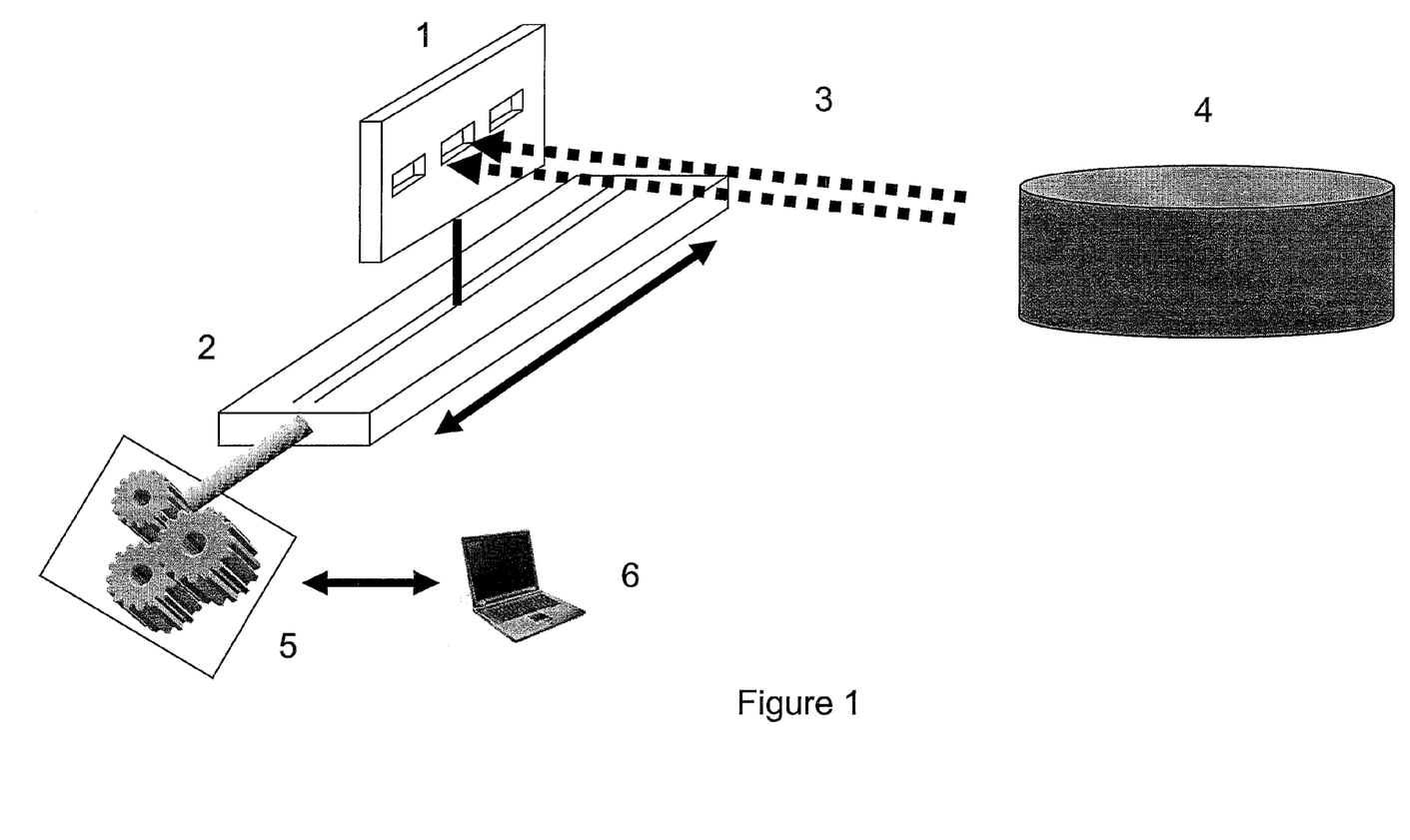

The sample holder (1) can be of metal or a metal alloy, such as aluminium, steel, tantalum, but preferably aluminium, and has one or more cells in which to house the powder to be irradiated these having a horizontal dimension from 10 mm to 300 mm, preferably 80 mm, and a vertical dimension of 1 to 10 mm, preferably 3 mm. Also, the powder housing depth cannot exceed 1 mm, preferably 0.5 mm, since the percentage of radiation absorbed by the LiF is high, and therefore the powder at the bottom of the housing receives much less radiation than the surface powder. At 10 keV, the radiation absorbed by 1 mm of LiF is actually about 80%. With the intention of having a uniform exposure, therefore, it is not advisable to further increase the housing depth. It is therefore evident that, given these dimensions, it is not possible to irradiate large quantities of powder for each individual exposure. From this the need arises to reduce exposure time and possibly provide an automated system for the loading/exposure/unloading thereof such as to optimize its production (sample holder (1) with several housings for the powder and an automated system for handling (5, 6)).

With this preparation method, a material is obtained in the form of a LiF powder which has those characteristics suitable for the previously mentioned envisaged uses.

The LiF powder, activated according to the invention with the aid of synchrotron light, can in fact be incorporated as a marker additive into bases and/or combined with diluents, surfactants and other components acceptable for inks, paints or glues for forming marks or logos directly on articles or on supports to be applied to any type of article. In particular, for anti-counterfeiting and/or identification purposes, such products can be in the form of solutions and/or suspensions where the concentration of activated LiF particles is comprised between 0.05M and 3M, preferably 0.5M. The products thus prepared (e.g. inks, pains or glues) can be used for forming one or more marks on items or on supports for application to items for anti-counterfeiting/identification purposes. Said marks, these being LiF particles which are invisible in sunlight, can be detected by illuminating them with a light source emitting blue-ultraviolet light, and optionally an orange filter and measuring the emission spectrum by suitable instrumentation (for example spectrofluorometry) as already previously mentioned.

If a large scale use for this technology is assumed, the most common printing techniques such as silk screen printing, flexography and others could hence be used. In this manner, small or large marks could be affixed directly or indirectly onto all types of article pertaining to the various types of merchandise categories which are currently targeted by counterfeiters. Again as an additive, the powder can be mixed with cellulose paste, plastic mixtures and other semi-processed products. The presence of the LiF powder in the finished product can be used as a marker for cataloguing or anti-counterfeiting. Such a use is particularly advantageous in the field of valuable goods and specifically the field of cultural heritage, because of the transparency of LiF. However, a broad usage can also be envisaged in fields relating to more widely used goods subject to possible counterfeiting.

In particular, the field of cultural heritage is still without any proper anti-counterfeit systems, and also in this sector the need is felt of providing identification systems for moveable property subject to protection. Indeed, activated LiF powder can be applied with the necessary technical devices onto paintings, documents and all types of objets d'art either for the purpose of validating their authenticity or for cataloguing purposes. As it is a case of artworks which are very often exhibited to the public and whose appearance can in no way be compromised, the use of this activated microscopic powder is ideal since it maintains its invisibility characteristics even when deposited onto the artwork.

Notwithstanding the particular care needed to handle these items, it is very difficult to apply anti-counterfeiting or cataloguing or authentication systems to articles which are to be exhibited to the public and whose viewing must not be disturbed by extraneous objects; it is for this reason that the use of activated LiF microparticles for anti-counterfeiting or cataloguing purposes can be suitable for fulfilling the requirements of this important field. On artistic assets such as paintings, the activated LiF microparticles can be mixed with the colours/paints/inks/glues that compose the painting in the desired shades, so as to put a mark, invisible in sunlight, in a specific area of the painting itself. In this manner a restoration specialist, for example, can include these marks without in any way altering the visual appearance of the painting.

With other artistic goods such as artefacts it will be possible to create a transparent ink/varnish containing the activated LiF microparticles with which to affix the mark onto the artefact. Once it has dried, the ink/paint fixes the (invisible) mark to the article. On other types of goods, not only artistic but pertaining to other fields, it will as before be possible to affix labels bearing marks produced with inks/paints containing activated LiF microparticles.

Another property of CCs which can be utilized for anti-counterfeiting purposes is the measurement of its emission spectrum; indeed, such a curve has a different characteristic shape than those of other fluorescent substances in the visible spectrum. The spectrum is characterized by 2 principal peaks positioned in the green and red visible region, more precisely centred at 542 nm and 660 nm respectively. Depending on the type of ionizing radiation to which the LiF powder was exposed during activation and according to the parameters characterizing the activation process, i.e. exposure time, irradiation dose, radiation energy etc, the emission spectrum changes with respect to the relative intensity of the two peaks, though they maintain the same shape and position. The spectrum produced by synchrotron-radiation activated colour centres has relative intensities of the two peaks, which are different from that of CC spectra produced with other ionizing radiation types. This spectrum, if determined using suitable instruments, can be a uniqueness factor of the mark and can hence be used for anti-counterfeiting purposes.

The preparation of the material in the form of the LiF powder of the invention is described below by way of non limiting illustration of the invention. As well as its preparation for the same purposes, the physico-chemical characterization of the activated LiF powder is also described in detail hereinafter.

EXPERIMENTAL PART

The experimental activity for producing submicroscopic LiF powder, activated by synchrotron light, involved the installation of experimental apparatus for both the mechanical degradation step and the activation step. The preparation of material in the form of the LiF powder of the invention is described below by way of non limiting illustration of the invention.

Example 1

Grinding Commercial LiF Powder or Crystals

The disintegration tests were undertaken in a jar mill (manufacturer: Retsch, model: PM 400), using jars of zirconium oxide ($ZrO_2$) with balls of the same material and jars of tungsten carbide (WC) with balls of the same material (no differences were found between the two materials). The jars were loaded with 10 g of commercial LiF produced by Alfa-Aesar, characterized by comprising particles greater than 5 µm in size in a quantity of more than 1% of the total number particles. The grinding treatments were carried out at medium and high power (up to a jar rotation speed of 300 rpm) under dry conditions (no solvent) and wet conditions (using solvents such as isopropanol and acetone). Treatment duration varied up to a maximum of 48 hours. The parameters enabling the best results in terms of particle size to be achieved (i.e. particles having a size distribution that can be approximated by a Gaussian curve centred at 160 nm and having a width at half height of 195 nm and comprising a residual number of agglomerates is greater than 5 µm in size in a quantity up to or less than 1% of the total number of particles) were 300 rpm for rotation velocity and 12 hours for duration.

Example 2

Determining the Size of the Particles of LiF Powder after Grinding

Figure 3:
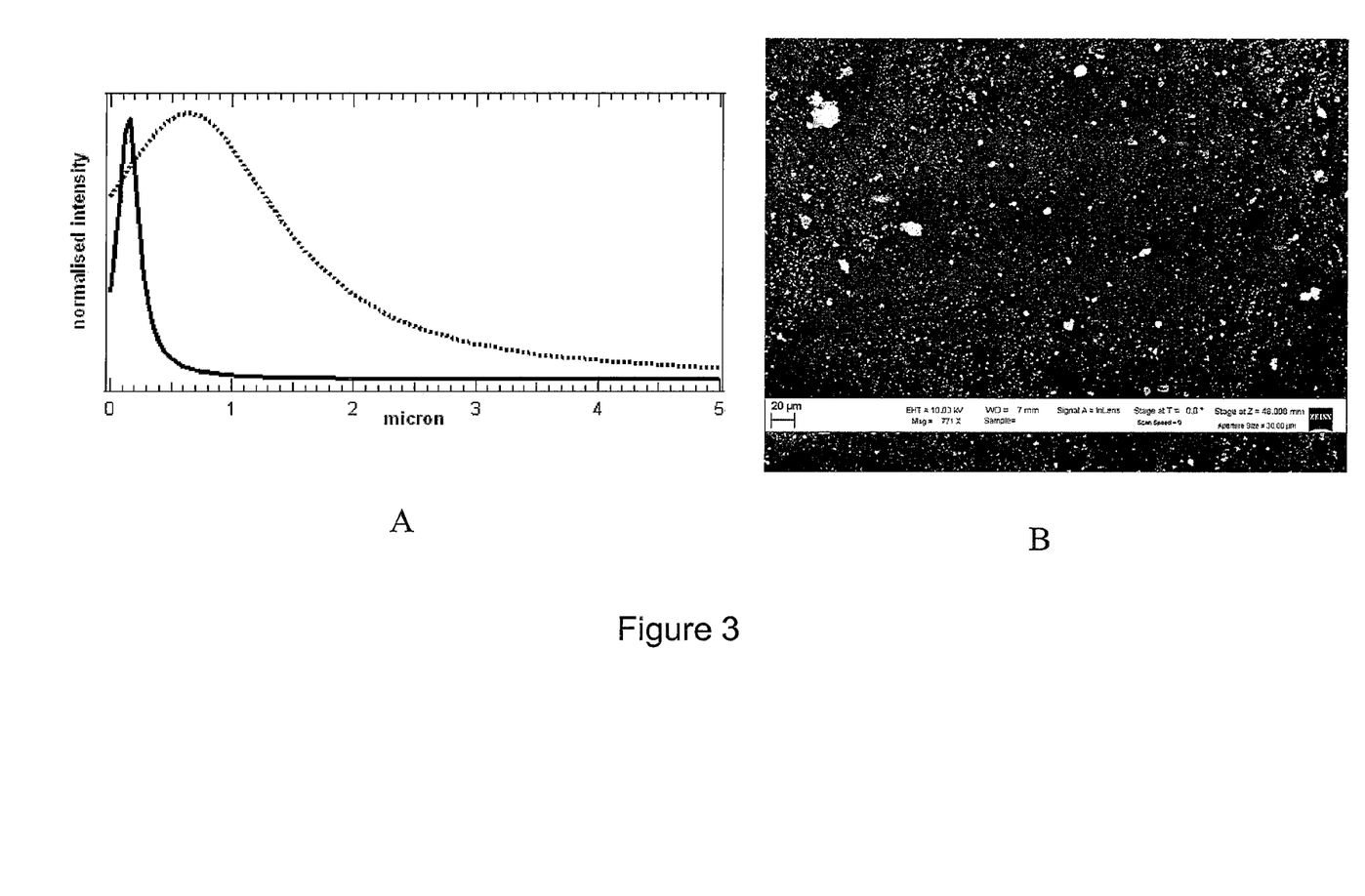

The particle size distribution of the powders obtained in example 1 was evaluated by measurements made with a scanning electron microscope (SEM) (model: Zeiss Supra 40) characterized by a spatial resolution of less than 2 nm. The commercial powders and those obtained by grinding were dispersed onto a surface of mirror polished silicon then measured using the SEM. The particle size analysis was carried out by analyzing the SEM images using dedicated software (Imagej). The number of analyzed particles was sufficiently high to ensure adequate statistics. The results are shown in FIG. 3.

Example 3

Activation by Irradiating the Particles of LiF Powder after Grinding

The microscopic powder thus obtained was then irradiated by synchrotron light. The synchrotron light source at the Elettra laboratory managed by Sincrotrone Trieste SCpA was used to carry out these exposures. In particular a bending magnet light source was used. For a more detailed description on the workings of a synchrotron and the light sources, refer to the website www.elettra.trieste.it. For this step it was necessary to prepare a sample holder system in aluminium consisting of a series of cells of equal sizes. The energy of the white light beam used for the exposures was comprised between 3 keV and 15 keV with a density of $10^{13}$ photons/s/$mm^2$ in the position in which the sample was placed i.e. 7 cm from the light source which in turn was placed 16 meters from the radiation generation part of the bending magnet. The radiation beam in the sample holder region irradiated an area of 2×2 $mm^2$, this being the reason why the cells were produced with these dimensions. It can be said that the surface irradiated by the radiation beam, and consequently the dimensions of the powder-holding cells, can change according to the characteristics of the radiation production line. The depth of the cells was fixed at 0.5 mm. Selection of said depth was based on the coefficient of absorption of the synchrotron radiation, having the aforementioned energy spectrum, by LiF. Said coefficient is about 50% for 10 keV photons, increasing for the lowest energies and decreasing for the highest energies. This means that the particles placed at the top of the cell will receive all the incident is photons whereas those placed at the bottom of the cell will receive about 50%. Because of the exposure time used (about 20 sec) the cell dimensions used ensured a substantially uniform distribution of CCs in all of the powder. Movement of the sample holder system in order to irradiate all the cells and hence to obtain sufficient amounts of powder for the experiment was regulated by a remote controlled electric motor. The exposures were conducted in air and at ambient temperature in a room protected from radiation leakage (hutch) in order to maintain operator safety.

Example 4

Measurement of Colour Centres after Irradiating the Ground LiF Powder

The density of the CCs produced was measured by comparing the fluorescence produced by the irradiated powder with a few reference samples having a known number of CCs, by means of a confocal microscope equipped with a calibrated spectrum detector.

Errors with this measurement, which can be estimated as only a few percentage points, do not actually change the order of magnitude of the numbers reported in this text.

Figure 4:
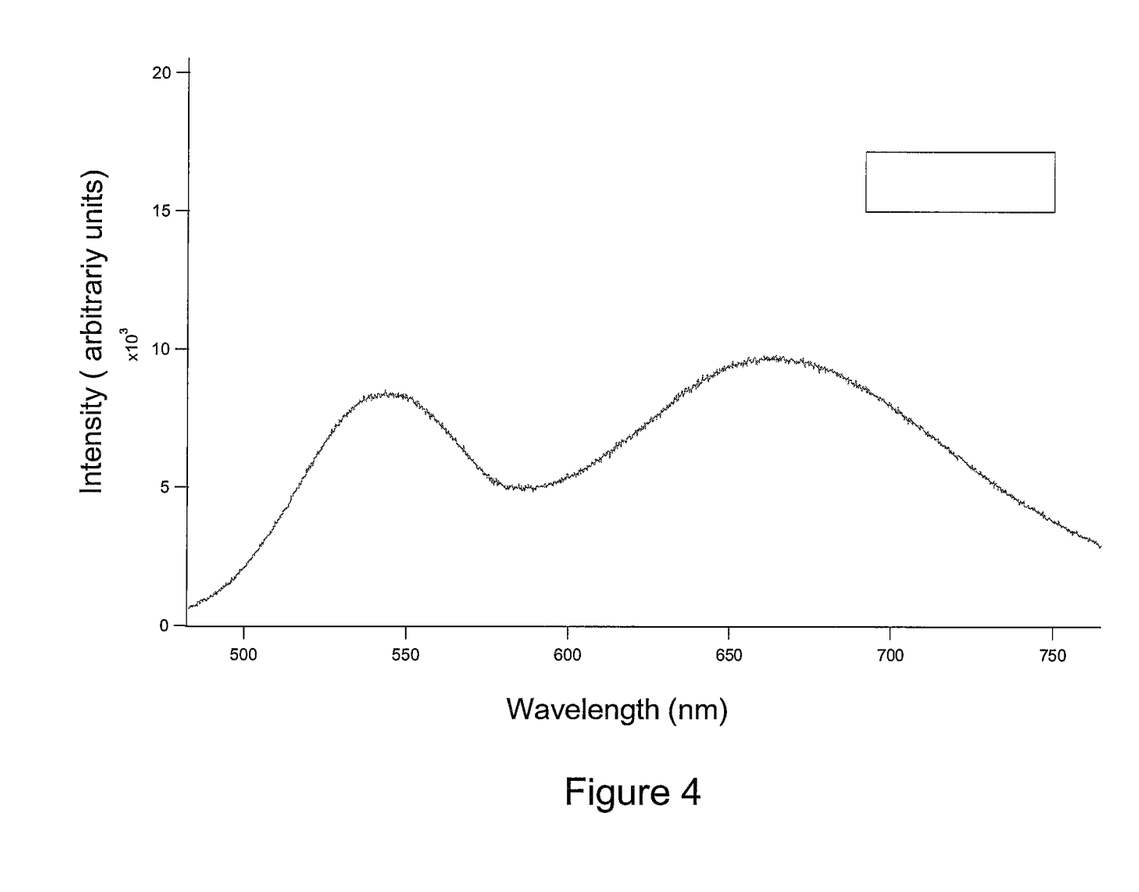
FIG. 4: the figure shows the typical emission spectrum of the microscopic LiF powder activated with non-monochromatized synchrotron light. The spectrum consists of two characteristic peaks, in the green and red regions of the visible light spectrum, centred at 542 nm and 660 nm respectively. These emission curves are characteristic of the $F_3^+$ and $F_2$ colour centres generated after exposure of LiF to ionizing radiation. The spectrum correlates to exposure time of lithium fluoride powder to radiation; the contribution of the two peaks to sample fluorescence can in fact be altered by varying exposure time.

For the measurement of the CC emission spectrum, an Ocean Optics commercial spectrofluorometer, model USB2000 was used, equipped with a fibre optic probe both for excitation and detection. Excitation of the CCs was carried out by means of a mercury lamp equipped with a suitable blue-UV filter. The technical characteristics of the spectrofluorometer used enabled the entire energy range produced by the CCs to be covered, as shown in FIG. 4. In this figure the spectrum clearly shows the two principal peaks for the CCs produced, the first in the green region (with a maximum at about 545 nm) and the second in the red region (with a maximum at about 660 nm).

Example 5a

Preparation of a Solution/Suspension Based on Activated LiF Particles

A solution/suspension was prepared of LiF powder activated as in the previous examples 1 and 3, utilizing compounds of the cellulose class or hydrophilic polymer resin class as suspension medium and LiF particle concentrations comprised between 0.01 and 1 M, preferably 0.5M. This choice was due to the fact that both cellulose and resins are more viscous than the most commonly usable solvents (water, ethylene, isopropanol etc.) and enable the logos and images of the utilized stamp to be transferred onto the substrate in a more uniform and controlled manner. The solution/suspension, prepared in a beaker, was vigorously agitated on a vibrating plate for about 10 minutes before the deposition tests. For the marking test, various materials were chosen as substrates on which to affix the marks, such as different types of paper, PET and polycarbonate plastic films, fabrics and particularly smooth surfaces such as silica crystals and precious materials such as gold and platinum. The tests were carried out either by simply depositing a few drops of the solution/suspension onto the substrates using micro-pipettes, or by immersing a stamp/sponge in the solution then placing it in contact with the substrate, otherwise with the aid of widely used commercially available printing systems, such as airbrushing. In all cases, the solvent was allowed to evaporate at ambient temperature with no particular procedures. The distribution of particles on the surface could be verified on particularly smooth substrates by electron microscope analysis (SEM), as well as the existence or otherwise of the auto-aggregation phenomenon over time. For this purpose the use of very smooth materials was deemed necessary to avoid ambiguities in interpreting the images obtained with the SEM. In this manner, the particles identified could be associated undeniably with LiF.

Figure 5:
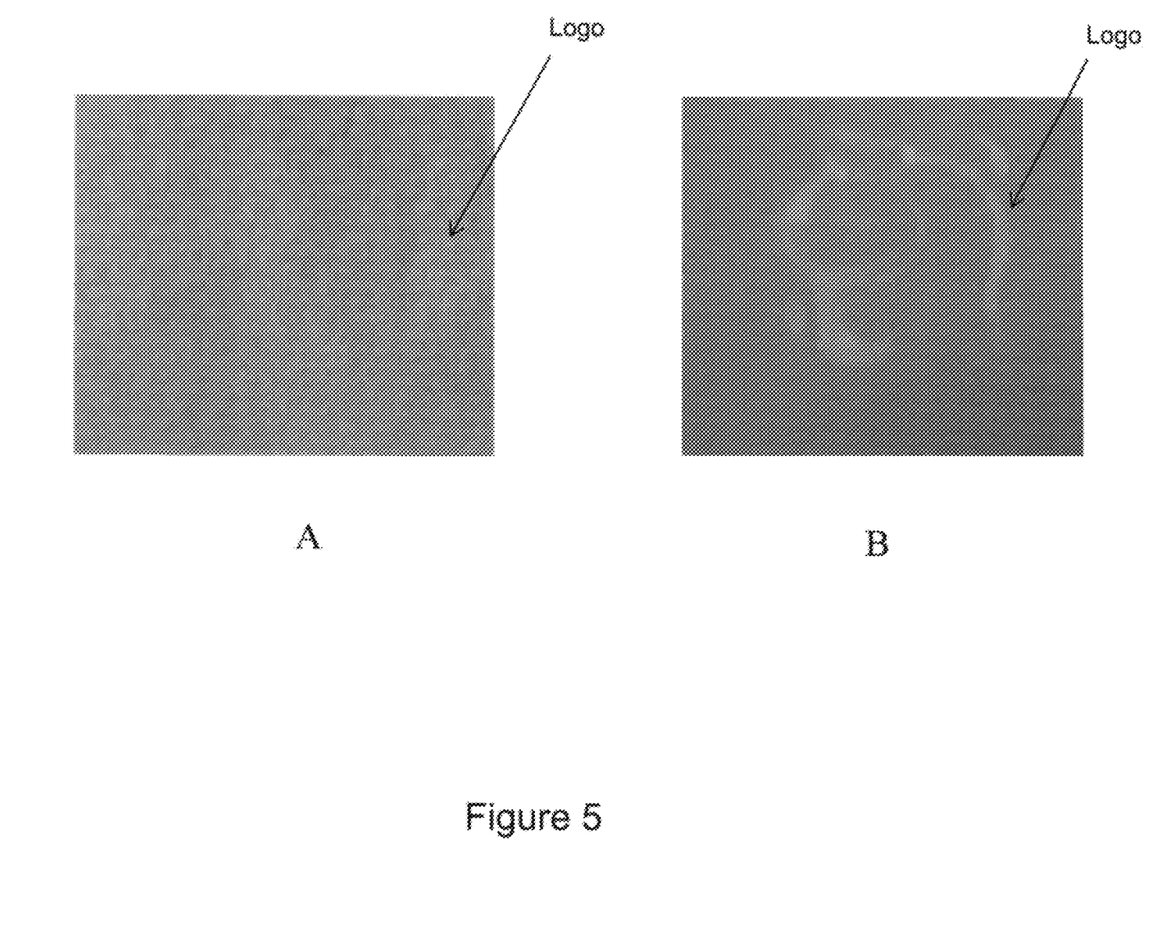
FIG. 5: the figure shows two images of a paper support on which a logo has been affixed by means of a stamp soaked in a solution based on activated LiF particles (see example 5 in the section "Experimental Part"). The image (A) was acquired by illuminating the mark with sunlight which, hence, does not reveal the presence of the logo, whereas the image (B) represents the same sample but illuminated with blue-ultraviolet radiation, which instead generates fluorescence from the CCs.

The second efficacy test of the suspension/solution was carried out by observing, with a fluorescence microscope, the radiation emitted from the areas covered by the LiF particles after solvent evaporation. The results (reported in FIG. 5) show that by using particles produced as in examples 1 and 3 in a concentration comprised between 0.01 and 1M, preferably 0.5M, there is a good emission of visible radiation if the areas are irradiated in the previously described manner.

Example 5b

Preparation of a Solution/Suspension Based on Activated LiF Particles

Classes of compounds more complex than those described in example 5a were also identified as suitable media for suspending LiF microparticles. The need for developing different methods for preparing LiF solutions derives from the specific surface diversity of the supports on which to apply them. For this purpose solutions of activated LiF powder were prepared in the manner described in examples 1 and 3 using hydrophilic glycosaminoglycan gels (GAG) as the medium in weight percentages comprised between 0.5 and 4%, preferably 1°/0. The concentrations of said solutions are between 0.1 and 1M and preferably 0.5M. GAGs are highly hydrophilic compounds which swell on contact with water giving rise to a gel. Both their hydrophilicity (it should be noted that water is the best solvent for lithium fluoride), and their propensity to form gels facilitates the suspension of LiF to provide disperse systems which are stable even for medium and long time periods. Moreover, the solutions thus obtained are characterized by their easily modulable viscosity and by their completely transparent appearance as well as their simple preparation.

In this case, as with example 5a, the prepared solutions were applied onto different supports: paper, plastic films, metals, fabrics and particularly smooth surfaces such as silica crystals. The application methods used have already been illustrated, in example 5a.

Following solvent evaporation, a thin transparent patina is more or less perceptible on the surface, the patina being compatible with the characteristics of the support (roughness, colour, etc.). On the smoothest supports, such as silica, morphological and size distribution analyses could be carried out on the particles using the scanning electron microscope with which their possible auto-agglomeration could be monitored over time. In this case also, the presence of activated powder was verified for each prepared sample by making use of a fluorescence microscope.

The invention claimed is:

1. A material in form of lithium fluoride powder characterized by:
   comprising particles having an average size of 160 nm and a size distribution that can be approximated by a Gaussian curve centred at said average size value and having a width at half height of 195 nm;
   having a colour centre content comprised from $1\times10^{16}$ Colour Centre (CC)/cm$^3$ to $1\times10^{19}$ (Colour Centre (CC)/cm$^3$; and
   having an emission spectrum with a characteristic shape and two peaks centered at 542 nm and 660 nm obtained with a beam of non-monochromatized radiation of an energy comprised from 3 to 15 keV and characterized by an intensity not less than $1\times10^{11}$ photons/s/mm$^2$, with a total dose comprised between $10^{14}$ and $10^{17}$ photons.

2. The material according to claim 1, wherein the colour centre content is $2\times10^{18}$ CC/cm$^3$.

3. The material according to claim 1 comprising LiF agglomerates greater than 5 μm in size in a quantity up to or less than 1% of the total particles.

4. A method for preparing the material in the form of lithium fluoride powder as defined in claim 1, comprising at least the steps of:
   a) mechanically degrading a commercial LiF powder by grinding processes until a powder is obtained comprising particles having an average size of 160 nm and a size distribution that can be approximated by a Gaussian curve centred at this size average value and having a width at half height of 195 nm;
   b) irradiating homogeneous layers of the lithium fluoride powder obtained in a) having a total area comprised from 10 mm$^2$ to 3000 mm$^2$ and a thickness not greater than 1 mm by exposure thereof to a beam of non-monochromatized radiation of an energy comprised from 3 to 15 keV and characterized by an intensity not less than $1\times10^{11}$ photons/s/mm$^2$, with a total dose comprised between $10^{14}$ and $10^{17}$ photons.

5. The method according to claim 4, wherein the energy of the radiation beam has a bell-shaped distribution centred at 8 keV.

6. The method according to claim 4, wherein the intensity of radiation beam is $3.5 \times 10^{13}$ photons/s/mm$^2$.

7. The method according to claim 4, wherein the irradiating total area is 300 mm$^2$.

8. The method according to claim 4, wherein the irradiating total area has a depth of 0.5 mm.

9. The method according to claim 4, wherein the commercial LiF powder is ground for a time period comprised from 4 to 48 hours.

10. The method according to claim 4 further comprising a step of separating LiF agglomerates greater than 5 µm in size to at least obtain a powder comprising said agglomerates in a quantity up to or less than 1% of the total number of particles.

11. A composition comprising the material, in the form of lithium fluoride powder as defined in claim 1 in combination with acceptable components for ink, paints, glues, wherein the material, in the form of lithium fluoride powder is a marker additive.

12. A composition according to claim 11, wherein the concentration of the material in the form of lithium fluoride powder is between 0.05M and 3M.

13. If A composition according to claim 11, wherein the concentration of the material in the form of lithium fluoride powder is 0.5M.

* * * * *